(12) United States Patent  (10) Patent No.: US 7,543,158 B2
Goss  (45) Date of Patent: Jun. 2, 2009

(54) HYBRID CRYPTOGRAPHIC ACCELERATOR AND METHOD OF OPERATION THEREOF

(75) Inventor: Steven C. Goss, Rockwall, TX (US)

(73) Assignee: Texas Instruments Incorporated, Dallas, TX (US)

( * ) Notice: Subject to any disclaimer, the term of this patent is extended or adjusted under 35 U.S.C. 154(b) by 733 days.

(21) Appl. No.: 10/806,963

(22) Filed: Mar. 23, 2004

(65) Prior Publication Data
US 2005/0213766 A1  Sep. 29, 2005

(51) Int. Cl.
*G06F 5/00*  (2006.01)
*G06F 3/00*  (2006.01)
*H04K 1/00*  (2006.01)

(52) U.S. Cl. .................. 713/189; 713/29; 713/30
(58) Field of Classification Search ............ 380/236, 380/29, 30; 713/189
See application file for complete search history.

(56) References Cited

U.S. PATENT DOCUMENTS

| 4,881,263 | A | * | 11/1989 | Herbison et al. ............ 713/162 |
| 5,631,960 | A | * | 5/1997 | Likens et al. ............... 380/2 |
| 5,825,878 | A | * | 10/1998 | Takahashi et al. .......... 713/190 |
| 6,289,455 | B1 | * | 9/2001 | Kocher et al. ............. 713/194 |
| 6,320,964 | B1 | * | 11/2001 | Callum .................. 380/29 |
| 6,327,661 | B1 | * | 12/2001 | Kocher et al. ............. 713/193 |
| 6,963,979 | B2 | * | 11/2005 | Fairclough et al. .......... 713/189 |
| 7,272,832 | B2 | * | 9/2007 | Gardner .................. 718/105 |
| 7,340,614 | B2 | * | 3/2008 | Fujiwara et al. ........... 713/193 |
| 2002/0062444 | A1 | * | 5/2002 | Law .................... 713/189 |
| 2003/0185391 | A1 | * | 10/2003 | Qi et al. ................. 380/44 |

OTHER PUBLICATIONS

Smith et al., "Using a High-Performance, Programmable Secure Coprocessor", 1998, Springer Berlin/Heidelberg, vol. 1465/1998, pp. 73-89.*
Smith et al., "Building a High-Performance, Programmable Secure Coprocessor", 1998, Draft, IBM TJ Watson Research Center, pp. 1-39.*

* cited by examiner

*Primary Examiner*—Kambiz Zand
*Assistant Examiner*—William S Powers
(74) *Attorney, Agent, or Firm*—Ronald O. Neerings; Wade James Brady, III; Frederick J. Telecky, Jr.

(57) ABSTRACT

For use in a system-on-a-chip (SoC) having a secure execution environment (SEE) containing secure memory, a cryptographic accelerator, a method of performing cryptography therewith and an SoC incorporating the cryptographic accelerator or the method. In one embodiment, the cryptographic accelerator includes: (1) a key register located within the SEE and coupled to the secure memory to receive a cryptographic key therefrom and (2) data input and output registers located outside of the SEE and coupled to the key register to allow the cryptographic key to be applied to input data arriving via the data input register to yield output data via the data output register.

20 Claims, 1 Drawing Sheet

HYBRID CRYPTOGRAPHIC ACCELERATOR AND METHOD OF OPERATION THEREOF

TECHNICAL FIELD OF THE INVENTION

The present invention is directed, in general, to cryptographic systems and, more specifically, to a hybrid cryptographic accelerator and method of encryption and decryption using a hybrid cryptographic operation.

BACKGROUND OF THE INVENTION

Decades ago, cryptography and cryptanalysis were relegated to the backrooms of covert organization such as the United States' Central Intelligence Agency and the United Kingdom's MI-6. Nowadays, however, electronic computing and communication have become so commonplace that everyone it seems is concerned about the sanctity of their computers and the privacy of their data and communications. The ever-increasing popularity of wireless communication has only heightened that concern. As a result, engineers with cryptographic skills are in great demand, and the latest computing and communicating systems are coming to market with cryptographic capability and data security as a cornerstone of their design. Wireless communication devices have certainly obeyed this trend.

To this end, a concept called a Secure Execution Environment, or "SEE," has begun to find its way into computing and communications systems. An SEE is designed to perform according to the following objectives: (1) programs are authenticated and therefore free of unexpected code before being admitted to run within the SEE, (2) programs and data within the SEE are free from unwanted interference from outside the SEE and (3) programs and data within the SEE cannot be read from outside the SEE. An elaborate authentication process, often involving permissions and digital signatures, is employed to meet all three objectives. Further, components within the SEE are isolated from user-accessible memory, buses or external pins to meet the second and third objectives. For this reason, SEEs are often provided with their own isolated, secure memory and buses. In fact, SEEs are advantageously implemented in Systems-on-a-Chip, or SoCs, allowing user-accessible external pins to be kept to a minimum.

SoC designers wanting to incorporate cryptographic capability into their systems have found SEEs to be a valuable way to ensure that cryptographic keys and processes remain secret. Unfortunately, while cryptography can certainly be carried out securely within an SEE, the data to be provided as input to the cryptographic process must pass securely into the SEE before it is encrypted or decrypted, and then it must pass out of the SEE. From an architectural perspective, the central processing unit is heavily involved in the movement of the data into and out of the SEE, and resource-consuming authentication must be done to ensure that false data are not allowed into the SEE. The result is that cryptography occurring within an SEE comes at a great cost in terms of processing overhead and resulting throughput. If a particular application calls for the encryption or decryption of time-sensitive streaming data or large files (as might well be encountered in a wireless environment), a diminished throughput would be particularly undesirable or even unacceptable.

In an effort to address the overall problem of encryption and decryption speed, hardware cryptographic "accelerators" have been introduced. A cryptographic accelerator uses dedicated cryptographic hardware to perform the same cryptographic functions that a central processing unit would otherwise perform with software. Not only can encryption and decryption be performed faster in hardware than in software, but the computational burden of the central processing unit can also be dramatically reduced, allowing it to perform other important tasks. A cryptographic accelerator may therefore be thought of as a "cryptographic co-central processing unit." Unfortunately, even with the availability of a cryptographic accelerator, SoC designers are faced with having to choose between placing the cryptographic accelerator within the SEE and continuing to suffer performance penalties by virtue of the required secure data movement, or placing the accelerator outside of the SEE and compromising the secrecy of the cryptographic key or process.

Accordingly, what is needed in the art is a way to achieve a higher encryption or decryption throughput in an SoC than uses a cryptographic accelerator without compromising key or process security.

SUMMARY OF THE INVENTION

To address the above-discussed deficiencies of the prior art, in one aspect the present invention provides, for use in an SoC having an SEE containing secure memory, a cryptographic accelerator. In one embodiment, the cryptographic accelerator includes (1) a key register located within the SEE and coupled to the secure memory to receive a cryptographic key therefrom and (2) data input and output registers located outside of the SEE and coupled to the key register to allow the cryptographic key to be applied to input data arriving via the data input register to yield output data via the data output register.

In another aspect, the present invention provides a method of performing cryptography in an SoC having an SEE containing secure memory. In one embodiment, the method includes: (1) loading a key register located within the SEE with a cryptographic key from the secure memory, the key register forming a part of a cryptographic accelerator and (2) applying the cryptographic key to input data arriving via a data input register to yield output data via a data output register, the data input and output registers located outside of the SEE.

In another aspect, the present invention provides an SoC. In one embodiment, the SoC includes: (1) a central processing unit (CPU), (2) a secure memory coupled to the CPU and having (2a) secure read-only memory (ROM) and (2b) secure static random-access memory (SRAM), the CPU and secure memory configured to provide an SEE and (3) a cryptographic accelerator, having: (3a) a key register located within the SEE and coupled to the secure memory to receive a cryptographic key therefrom and (3b) data input and output registers located outside of the SEE and coupled to the key register to allow the cryptographic key to be applied to input data arriving via the data input register to yield output data via the data output register.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
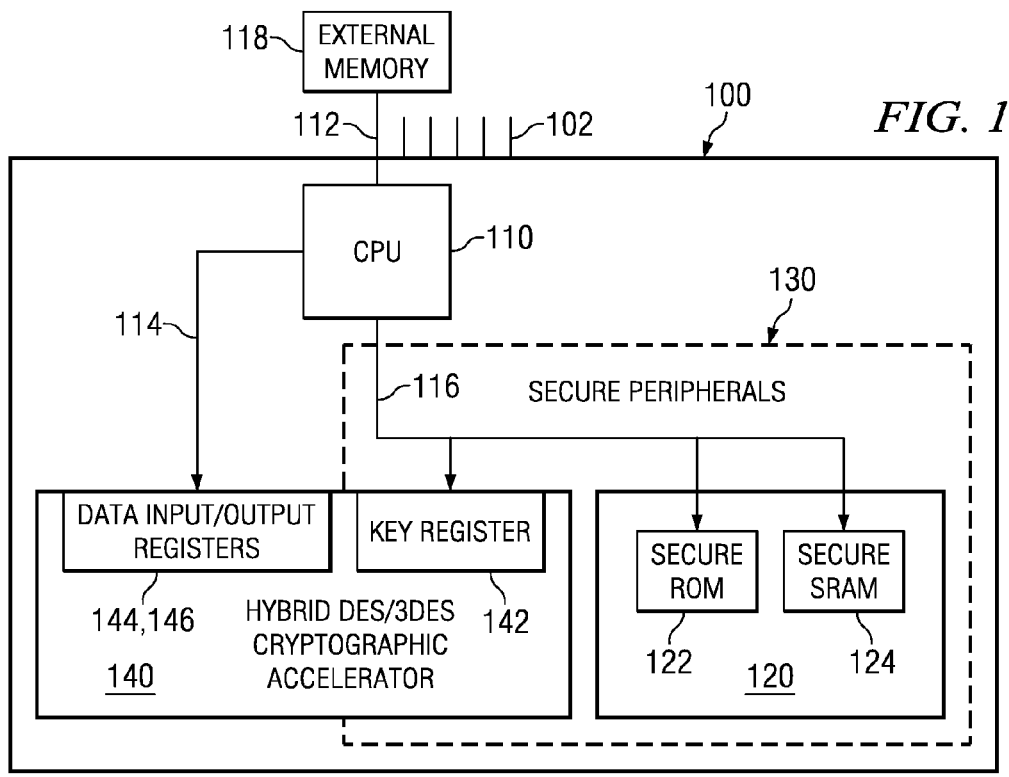
FIG. 1 illustrates a block diagram of one embodiment of an SoC incorporating a hybrid cryptographic accelerator constructed according to the principles of the present invention.

Referring initially to FIG. 1, illustrated is a block diagram of one embodiment of a System-on-a-Chip (SoC), generally designated 100, incorporating a hybrid cryptographic accelerator constructed according to the principles of the present invention.

SoCs in general are familiar to those skilled in the pertinent art and thus will not be described in detail greater than necessary to convey the inventive concepts introduced herein. The SoC 100 includes a central processing unit (CPU) 110. The CPU 110 is coupled via buses (some of which are shown and designated 112, 114, 116) to various peripheral components. Among those peripheral components is a secure memory space 120 composed in the specific embodiment of FIG. 1 of a secure read-only memory (ROM) 122 and secure static random-access memory (SRAM) 124. The CPU 110 has access to external memory 118 and other components (not shown) via the bus 112. Because it goes outside the SoC 100, the bus 112 requires various external pins (only one of which is designated 102) of the SoC 100. Thus, the CPU 110 and peripheral components can receive and transmit programs, data and control signals from and to the external memory 118 and other external system components in a manner that is well known to those skilled in the pertinent art.

The SoC 100 is illustrated as having the capability to create a secure execution environment (SEE) 130. In FIG. 1, the SEE 130 is represented as a broken line encompassing the secure ROM 122 and secure SRAM 124. Although the SEE 130 is an architectural abstraction, those skilled in the pertinent art understand that system components within the SEE 130 (e.g., the secure ROM 122 and the secure SRAM 124) are secured as against unwanted infiltration and interference as described above in the Background of the Invention section. As a practical matter, the SEE 130 is created by physically and/or logically isolating components within the SEE 130 from those outside of the SEE 130 and the various external pins (e.g., the pin 102) and by equipping the CPU 110 with a secure mode or state of operation in which the CPU 110 isolates itself from external components and renders its registers user-inaccessible for either read or write purposes.

FIG. 1 also illustrates a schematic representation of a hybrid cryptographic accelerator 140 constructed according to the principles of the present invention. The term "hybrid" is appropriately used because, as FIG. 1 illustrates, the cryptographic accelerator 140 straddles both the SEE 130 and the portion of the SoC 100 that is outside of the SEE 130. More particularly, a key register 142 of the hybrid cryptographic accelerator 140 lies within the SEE 130 and is coupled to the secure ROM 122 and the secure SRAM 124 by a secure bus 116. In contrast, data input and output registers 144, 146 of the hybrid cryptographic accelerator 140 lie outside of the SEE 130 and are coupled to the CPU 110 by a bus 114 that is not secure and therefore is wholly separate from the secure bus 116. Thus, the hybrid cryptographic accelerator 140 operates partially within and partially without the SEE 130. As will be described below, this arrangement yields a particularly advantageous operation that accommodate both cryptographic key security and high data throughput.

Figure 2:
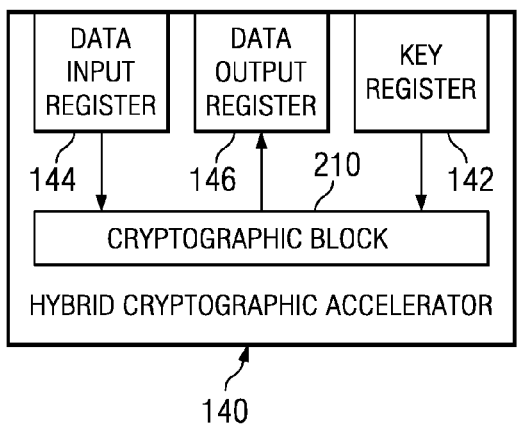
FIG. 2 illustrates a block diagram of one embodiment of a hybrid cryptographic accelerator constructed according to the principles of the present invention.

Turning now to FIG. 2, illustrated is a more detailed block diagram of one embodiment of the cryptographic accelerator 140 constructed according to the principles of the present invention. The cryptographic accelerator 140 includes the key register 142 first illustrated in FIG. 1. The key register 142 is coupled to the secure memory as detailed above so as to receive a cryptographic key in a secure manner. The key register 142 may advantageously be a write-only register and may be writeable only when the CPU (110 of FIG. 1) is in a secure state. The cryptographic key is advantageously never transmitted in the clear outside the SEE 130.

The cryptographic accelerator 140 further includes the data input and output registers 144, 146 first illustrated in FIG. 1. The data input register(s) 144 receives input data to be encrypted or decrypted, and the data output register(s) provide output data that has been encrypted or decrypted.

Also illustrated is a cryptographic block 210. Those skilled in the pertinent art are familiar with the structure and function of cryptographic blocks in general. They understand that cryptographic blocks employ a cryptographic key and a cryptographic algorithm to perform a cryptographic operation on input data to yield output data. The cryptographic operation may be one of encryption or decryption. The cryptographic block 210 is therefore coupled to the key register 142 and the data input and output registers 144, 146 to receive the key and input data and produce the output data based thereon. In the embodiment illustrated in FIG. 2, the cryptographic block 210 is a Data Encryption Standard (DES) block or a triple Data Encryption Standard (3DES) block. Those skilled in the pertinent art will understand, however, that any conventional or later-developed cryptographic block or combination of multiple cryptographic blocks falls within the broad scope of the present invention and is employable as the cryptographic block 210.

Important to an understanding of the present invention is that, while the cryptographic register 142 and the cryptographic key the register contains remain within the SEE (130 of FIG. 1), the data input and output registers 144, 146 remain outside of the SEE. Since, in the illustrated embodiment, the CPU mediates movement of the input data and the output data between the data input and output registers and the external memory, bandwidth-consuming security operations that would otherwise be required to move the input data to within the SEE are wholly avoided such that the speed at which the SoC (100 of FIG. 1) can encrypt or decrypt can be significantly enhanced. In fact, direct memory access (DMA) can be advantageously employed further to reduce any CPU involvement in data transfer. All the while, the key register 142 remains unreachable from the data input and output registers 144, 146, thereby preserving the secrecy of the cryptographic key.

Figure 3:
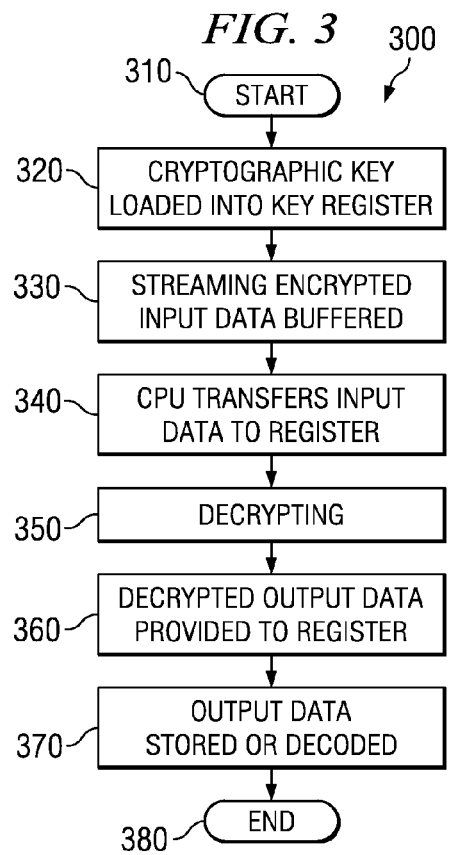
FIG. 3 illustrates a flow diagram of one embodiment of a method of performing cryptography in an SoC having an SEE containing secure memory carried out according to the principles of the present invention.

Turning now to FIG. 3, illustrated is a flow diagram of one embodiment of a method, generally designated 300, of performing cryptography in an SoC having an SEE containing secure memory carried out according to the principles of the present invention.

The method 300 begins in a start step 310, wherein it is desired, for example, to decrypt streaming input data received by a mobile telecommunications device. In a step 320, the CPU of the SoC enters a secure state and calls for an appropriate cryptographic key to be conveyed from a secure SRAM to a secure key register of a hybrid cryptographic accelerator via a secure bus. Afterwards, the CPU is free to exit the secure state, though it need not. Then, in a step 330, the mobile telecommunications device buffers the streaming encrypted input data in a memory external to the SoC.

Next, in a step 340, the CPU of the SoC mediates a transfer of the streaming encrypted input data from the external memory to one or more insecure data input registers of a hybrid cryptographic accelerator without. At no point does the streaming encrypted input data enter the SEE.

Then, in a step 350, a cryptographic block within the hybrid cryptographic accelerator operates on the streaming encrypted input data to yield streaming decrypted output data. In a step 360, the streaming decrypted output data are provided to one or more insecure data output registers of the hybrid cryptographic accelerator. Next, in a step 370, the streaming decrypted output data, which may now take the form of a file or coded voice or video, is stored or decoded for hearing or watching, as the case may be. The method 300 ends in an end step 380.

While the method disclosed herein has been described and shown with reference to particular steps performed in a particular order, it will be understood that these steps may be combined, subdivided, or reordered to form an equivalent method (including, of course, various other decrypting or encrypting methods) without departing from the teachings of the present invention. Accordingly, unless specifically indicated herein, the order and the grouping of the steps are not limitations of the present invention.

Although the present invention has been described in detail, those skilled in the art should understand that they can make various changes, substitutions and alterations herein without departing from the spirit and scope of the invention in its broadest form.

What is claimed is:

1. For use in a system-on-a-chip (SoC) having a secure execution environment (SEE) containing secure memory, a cryptographic accelerator, comprising:
   a key register located within said SEE and coupled to said secure memory to receive a cryptographic key therefrom; and
   data input and output registers located outside of said SEE and coupled to said key register to allow said cryptographic key to be applied to input data arriving in said data input register to yield output data in said data output register.

2. The cryptographic accelerator as recited in claim 1 wherein a secure data bus coupling said key register and said secure memory is isolated from external pins of said SoC.

3. The cryptographic accelerator as recited in claim 1 wherein a cryptographic block coupled to said key register and said data input and output registers is selected from the group consisting of:
   a Data Encryption Standard (DES) block, and
   a triple Data Encryption Standard (3DES) block.

4. The cryptographic accelerator as recited in claim 1 wherein said key register is a write-only register and writeable only when a central processing unit of said SoC is in a secure state.

5. The cryptographic accelerator as recited in claim 1 wherein a data bus coupled to said input and output registers is further coupled to external pins of said SoC.

6. The cryptographic accelerator as recited in claim 1 wherein a central processing unit mediates movement of said input data and said output data between said input and output registers and memory external to said SoC.

7. The cryptographic accelerator as recited in claim 1 wherein said secure memory comprises secure read-only memory and secure static random-access memory.

8. A method of performing cryptography in a system-on-a-chip (SoC) having a secure execution environment (SEE) containing secure memory, comprising:
   loading a key register located within said SEE with a cryptographic key from said secure memory, said key register forming a part of a cryptographic accelerator; and
   applying said cryptographic key to input data arriving in a data input register to yield output data in a data output register, said data input and output registers located outside of said SEE.

9. The method as recited in claim 8 wherein a secure data bus coupling said key register and said secure memory is isolated from external pins of said SoC.

10. The method as recited in claim 8 wherein said applying is carried out in a cryptographic block coupled to said key register and said data input and output registers, said cryptographic block selected from the group consisting of:
    a Data Encryption Standard (DES) block, and
    a triple Data Encryption Standard (3DES) block.

11. The method as recited in claim 8 wherein said key register is a write-only register and writeable only when a central processing unit of said SoC is in a secure state.

12. The method as recited in claim 8 wherein a data bus coupled to said input and output registers is further coupled to external pins of said SoC.

13. The method as recited in claim 8 further comprising mediating movement of said input data and said output data between said input and output registers and memory external to said SoC with a central processing unit.

14. The method as recited in claim 8 wherein said secure memory comprises secure read-only memory and secure static random-access memory.

15. A system-on-a-chip (SoC), comprising:
    a central processing unit;
    a secure memory coupled to said central processing unit (CPU) and including:
       secure read-only memory (ROM), and
       secure static random-access memory (SRAM), said CPU and said secure memory configured to provide a secure execution environment (SEE); and
    a cryptographic accelerator, including:
       a key register located within said SEE and coupled to said secure memory to receive a cryptographic key therefrom, and
       data input and output registers located outside of said SEE and coupled to said key register to allow said cryptographic key to be applied to input data arriving in said data input register to yield output data in said data output register.

16. The SoC as recited in claim 15 wherein a secure data bus coupling said key register and said secure memory is isolated from external pins of said SoC.

17. The SoC as recited in claim 15 wherein a cryptographic block coupled to said key register and said data input and output registers is selected from the group consisting of:
    a Data Encryption Standard (DES) block, and
    a triple Data Encryption Standard (3DES) block.

18. The SoC as recited in claim 15 wherein said key register is a write-only register and writeable only when said CPU is in a secure state.

19. The SoC as recited in claim 15 wherein a data bus coupled to said input and output registers is further coupled to external pins of said SoC.

20. The SoC as recited in claim 15 wherein said CPU mediates movement of said input data and said output data between said input and output registers and memory external to said SoC.

* * * * *